(12) United States Patent
York et al.

(10) Patent No.: US 8,185,608 B1
(45) Date of Patent: May 22, 2012

(54) CONTINUOUS USABILITY TRIAL FOR A WEBSITE

(75) Inventors: Jeremy York, Bothell, WA (US); Ron Kohavi, Issaquah, WA (US)

(73) Assignee: Amazon Technologies, Inc., Seattle, WA (US)

( * ) Notice: Subject to any disclaimer, the term of this patent is extended or adjusted under 35 U.S.C. 154(b) by 832 days.

(21) Appl. No.: 11/291,507

(22) Filed: Dec. 1, 2005
(Under 37 CFR 1.47)

(51) Int. Cl.
*G06F 15/16* (2006.01)
*G06F 15/173* (2006.01)

(52) U.S. Cl. .................. 709/218; 709/203; 709/224

(58) Field of Classification Search .................. 709/218
See application file for complete search history.

(56) References Cited

U.S. PATENT DOCUMENTS

| | | | |
|---|---|---|---|
| 6,038,598 A * | 3/2000 | Danneels | 709/219 |
| 6,714,975 B1 * | 3/2004 | Aggarwal et al. | 709/224 |
| 7,295,995 B1 | 11/2007 | York et al. | |
| 7,467,349 B1 | 12/2008 | Bryar et al. | |
| 2002/0046281 A1 | 4/2002 | Cope | |
| 2002/0062245 A1 | 5/2002 | Niu et al. | |
| 2002/0078141 A1 * | 6/2002 | Cohen et al. | 709/203 |
| 2002/0116244 A1 * | 8/2002 | Honarvar et al. | 705/7 |
| 2002/0133720 A1 | 9/2002 | Sherman et al. | |
| 2002/0174219 A1 | 11/2002 | Mei et al. | |
| 2003/0101265 A1 | 5/2003 | Dantzig et al. | |
| 2003/0208578 A1 | 11/2003 | Taraborelli et al. | |
| 2004/0153358 A1 | 8/2004 | Lienhart | |
| 2005/0119939 A1 * | 6/2005 | Henning et al. | 705/14 |
| 2005/0262240 A1 | 11/2005 | Drees et al. | |
| 2007/0162260 A1 | 7/2007 | Nordstrom | |

OTHER PUBLICATIONS

Eisenberg, Bryan "How to Decrease Sales by 90 percnet", ClickZ/ROI Marketing, http://www.clickz.com/experts/crm/traffic/article.php/1588161, printed off the Internet Jun. 7, 2006; 4 pages.
Eisenberg, Bryan "How to Improve A/B Testing", http://www.inetasia.com/webtrends/how_to_improve_ab_testing.html, printed off the internet Aug. 8, 2006, 2 pages.
Eisenberg, Bryan "How to Increase Conversion Rate 1,000 Percent", ClickZ/ROI Marketing, http://www.clickz.com/experts/crm/traffic/article.php/1756031, printed off the internet on Jun. 7, 2006, 5 pages.
http://www.offermatica.com, printed off the Internet Jun. 8, 2006, 1 page.
http://www.optimost.com, printed off the internet Jun. 8, 2006, 1 page.

(Continued)

*Primary Examiner* — Jeffrey Pwu
*Assistant Examiner* — Noel Beharry
(74) *Attorney, Agent, or Firm* — Lee & Hayes, PLLC

(57) ABSTRACT

A continuous website trial allows ongoing observation of user interactions with website for an indefinite period of time that is not ascertainable at initiation of the trial. Users are randomly assigned to either a control group or one or more test groups. The control and test groups are served different sets of web pages, even though they access the same website. During the trial, the web pages for the control group are held constant over time, while the web pages for the test group(s) undergo multiple modifications at separate occasions over time. As the web pages for the test group(s) are modified, statistical data collection continues to learn how user behavior changes as a result of the modifications. The statistical data obtained from the users of the various groups may be compared and contrasted and used to gain a better understanding of customer experience with the website.

49 Claims, 8 Drawing Sheets

OTHER PUBLICATIONS http://www.touchclarity.com, printed off the internet Jun. 8, 2006, 1 page.

http://www.memetrics.com, printed off the internet Jun. 23, 2006, 1 page.

http://www.offermatics.com/whatis-1.0.html.

Kohavi, Ronny et al., "Emetrics Summit 2004: Front Line Internet Analytics at Amazon.com", Copyright 2004, Amazon.com, 31 pages.

Rossi et al., "Evaluation: A Systematic Approach", Seventh Edition, 2003, entire book.

Stern, Jim "Web Metrics—Proven Methods for Measuring Web Site Success" Wiley Publishing, Inc. 2002, entire book.

Bryar, et al., Displaying Links at Varying Levels of Prominence to Reveal Emergent Paths Based on User Interaction, U.S. Appl. No. 11/186,357, filed Jul. 21, 2005.

Bryar, et al., Method and System for Displaying a Hyperlink at Multiple Levels of Prominence Based on User Interaction, U.S. Appl. No. 12/248,829, filed Oct. 9, 2008.

Nordstrom, P.G., et al., Method and System for Collecting and Analyzing Time-Series Data, U.S. Appl. No. 11/374,875, filed Mar. 14, 2006.

Pope, E.E., et al., Method and System for Determining Interest Levels of Online Content Based on Rates of Change of Contecnt Access, U.S. Appl. No. 11/238,070, filed Sep. 28, 2005.

Pope, E.E., et al., System and Method for Indicating Interest of Online Content, U.S. Appl. No. 11/238,079, filed Sep. 28, 2005.

Scofield, C.L., et al., Method and System for Associating Keywords With Online Content Sources, U.S. Appl. No. 11/321,697, filed Dec. 29, 2005.

Scofield, C.L., et al., Method and System for Determining Interest Levels of Online Content Navigation Paths, U.S. Appl. No. 11/321,890, filed Dec. 29, 2005.

Scofield, C.L., et al., Method and System for Determining Interest Spaces Among Online Content Souces, U.S. Appl. No. 11/321,895, filed Dec. 29, 2005.

* cited by examiner

VERSION II OF TEST
GROUP WEB PAGE
400

VERSION III OF TEST
GROUP WEB PAGE
500 ures, in the figures, the left-most digit(s) of
CONTINUOUS USABILITY TRIAL FOR A WEBSITE

BACKGROUND

In any market, understanding customer behavior is important for understanding customer satisfaction. This is true of traditional retail businesses, where there are well developed mechanisms for determining customer satisfaction. In brick-and-mortar businesses, customers can be directly observed as they walk through a store. Indicia of satisfaction may include how long customers stay in the store, what items they purchase, how much they spend, and so forth. Exit interviews can also be performed to determine customer satisfaction. Some merchants maintain databases of general customer behavior that may then be used for such purposes as inventory control, product placement, and new product analysis.

Understanding customer behavior is also useful for electronic commerce, but the techniques of observing the customer in this medium are necessarily different. The way that customers interact with an e-commerce website is radically different from the experience of walking into a business in person and making a purchase. When web visitors browse a website, it is often difficult to know if they had a good or bad experience at the website. The electronic merchants are very interested in knowing whether visitors found the site to be usable and if so, whether they were satisfied with their experience at the website.

Conventionally, observation of users in online systems has typically involved collecting user-provided informtion about their interests and customer satisfaction levels. Other websites more systematically track user behavior in terms of "click throughs," other clickstream data, and page views, and then assemble information about these activities. As a user's activity changes on a particular website, the assembled information is updated. While this approach captures some aspects of change in user behavior, it is typically limited to identifying only those interests relative to a single web page of the website that does not change over time. Moreover, the approach generally has a finite observation duration, which limits the robustness of the collected information.

SUMMARY

A continuous website trial allows ongoing observation of user interactions with website for an indefinite period of time that is not ascertainable at initiation of the trial. Users are randomly assigned to either a control group or one or more test groups. Unique identifiers may be used to facilitate the assignment and tracking of users during the trial. The control and test groups are served different sets of web pages, even though they access the same website. Thus, users in the test group access one set of web pages and users in the control group access another set of web pages that differ from the first set in some manner. The differences can range from small and barely noticeable variances to significant and readily observable modifications. During the trial, user interactions of both groups of users with the various web pages are tracked. Additionally, the web pages for the control group are held constant over time, while the web pages for the test group(s) undergo multiple modifications at separate occasions over time. As the web pages for the test group(s) are modified, statistical data collection continues to learn how user behavior changes as a result of the modifications. The statistical data obtained from the users of the various groups may be compared and contrasted and used to gain a better understanding of customer experience with the website.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical items.

FIGS. 3-5 illustrate these pages as they might appear when rendered by a web browser of a computing device.

DETAILED DESCRIPTION

This disclosure is directed to a usability trial for facilitating continuous and ongoing observation of user interactions with web pages associated with a website. The continuous usability trial defines and monitors multiple groups of users. The user groups include at least one control group in which users are served web pages that remain unchanged over time and one or more test groups in which users are served web pages that undergo various changes over time. In this manner, users in different groups view different web pages (e.g., different layouts, color schemes, content, functionality, etc.) and hence engage in different experiences with the website. The groups' interactions with the different web pages are tracked and analyzed in an effort to discern whether the adjustments made to the pages had an effect on user behavior. Moreover, since the trial is indefinite in length, the web pages of the test groups may continue to be changed over time to enable observation of user behavior over a series of modifications.

The continuous usability trial may be implemented in a number of ways. One example implementation is provided below with reference to FIGS. 1-10, as described below.

System Architecture

Figure 1:
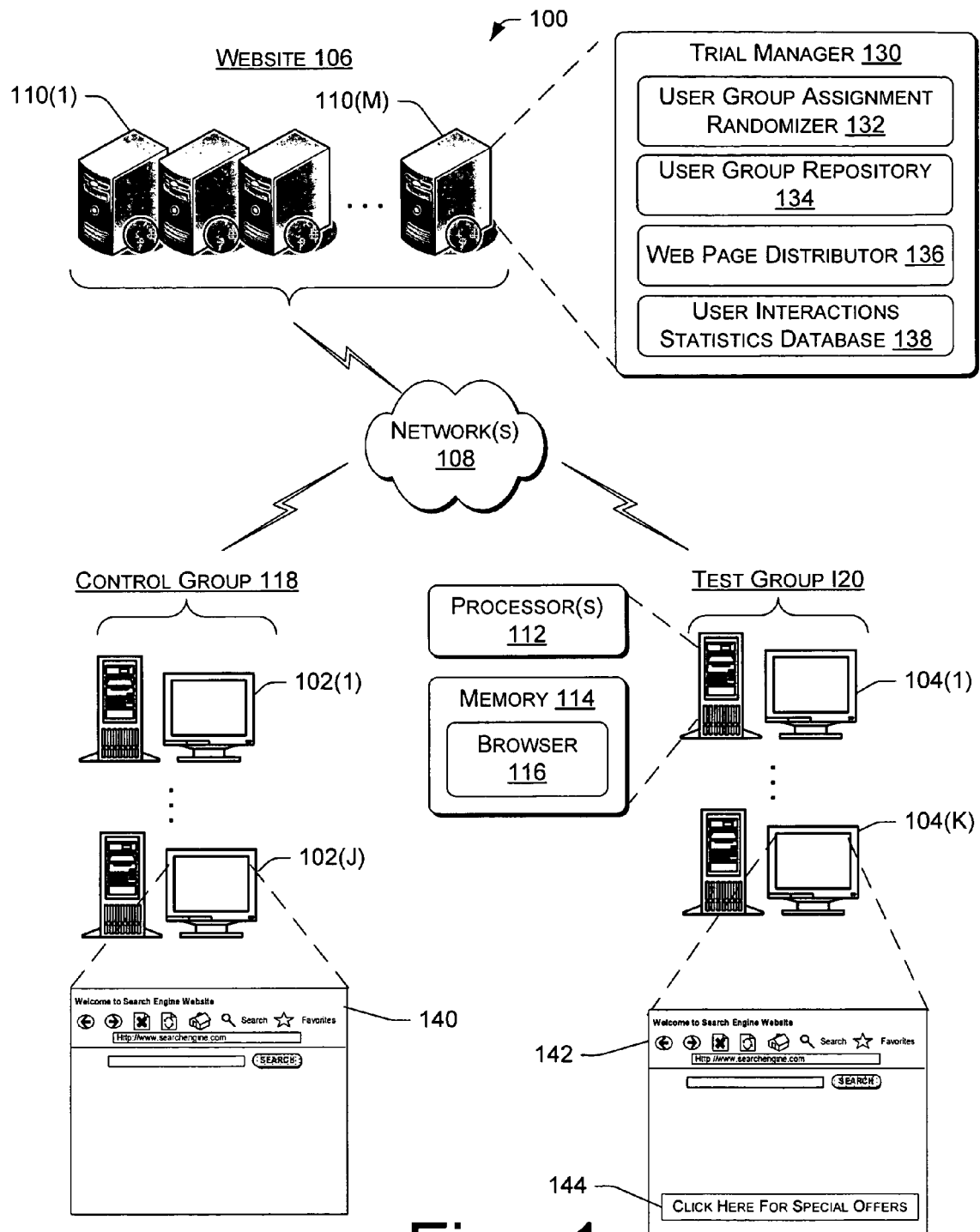
FIG. 1 illustrates an example architecture in which continuous usability trials for a website may be performed to observe user interactions and behavior. The network environment includes multiple clients coupled via a network to a server system that hosts the website.

FIG. 1 illustrates an example architecture 100 in which a continuous usability trial may be performed to observe user interactions and behavior with a website. In environment 100, many user computing devices 102(1), . . . , 102(J) and 104(1), . . . , 104(K) can access a website 106 via a network 108. The network 108 is representative of many different types of networks, whether used singly or in combination, such as cable networks, the Internet, and wireless networks.

The website 106 is hosted on one or more servers 110(1), ..., 110(M), perhaps arranged as a server farm. Other server architectures may also be used to host the site. The website 106 is capable of handling requests from many users and serving, in response, various web pages that can be rendered at the user computing devices 102 and 104. The website is representative of essentially any site supporting user interaction, including online retailers and other e-commerce merchants, informational sites, search engine sites, news and entertainment sites, and so forth.

The user computing devices 102 and 104 (also referred to as "client computers" or simply "clients") are illustrated as personal computers, but may also be implemented as other devices, such as set-top boxes, a game consoles, laptop computers, portable digital assistants (PDAs), cellular phones, and so forth. Each user computing device 102 and 104 is equipped with one or more procesors 112 and memory 114 to store applications and data. A browser application 116 is shown stored in memory 114 and executes on a processor 112 to provide access to the website 106. The browser 116 renders web pages served by the website 106 on an associated display.

When users direct clients 102 and 104 to request content from the website 106, the computing devices send uniform resource locator (URL) requests to the servers 110. All the users 102 and 104 access the same website 106. For instance, the users may submit URL requests, each of which contains essentially the same root domain name, such as www-dot-searchengine-dot-com. Upon receiving a URL request, the servers 110 return a web page back to the requesting client computer. The user computing device invokes the browser 116 to render the web page, allowing the user to interact with the web page.

This website 106 is configured to support a continuous usability trial that provides ongoing observation of user interactions with the site. As part of the trial, the servers 110(1)-110(M) separate the users into multiple groups that include at least one control group 118, represented by user computing devices 102(1)-102(J), and at least one test group 120, represented by user computing devices 104(1)-104(K). It is noted that there may be multiple control groups and multiple test groups, although two groups are illustrated for ease of discussion.

A trial manager application 130 runs on one or more of the servers 110(1)-110(M) to manage the trial across the multiple user groups 118 and 120. The trial manager 130 includes a user group assignment randomizer 132, a user group repository 134, a web page distributor 136, and a user interactions statistics database 138. The user group assignment randomizer 132 defines the groups (e.g., one control group and one or more test groups) and assigns users to the various groups in a random fashion. In this example, the trial manager defines two groups: a control group 118 and a test group 120. The trial manager 130 maintains and differentiates the users of these two groups in a user group repository 134. The number of users in each group is a variable that can be selected by personnel running the trial. The group size may be based in part, for example, on the size of the user population. For popular sites, it would not be uncommon to assign millions of users to each of the various groups.

Once users are assigned to a group, a web page distributor 136 facilitates distribution of different web pages to the various groups and observes the user interactions with those web pages. The client computers 102(1)-102(J) of the control group 118 are served one web page with one set of attributes, represented by an example page 140 rendered on device 102 (J). The client computers 104(1)-104(K) of the test group 120 receive a different web page with another set of attributes, as represented by an example page 142 rendered on device 104 (K). The web pages are very similar, differing only in the addition of a selection button 144 (i.e., a "Click Here for Special Offers" button) on the bottom of page 142 (but not included on page 140). It is noted that all user computers 102(1)-102(J) and 104(1)-104(K) access the same website 106 (e.g., using the same domain name, such as, www-dot-searchengine-dot-com), but different web pages are served to the user computers depending upon which group the users belong.

The differences between the web pages served to the various groups may be essentially anything that can be tracked by the servers and analyzed to determine if user behavior changes. The differences may be changes in content or the addition or omission of attributes that require user interaction (as illustrated with the addition of a "Click Here" selection button 144). Another example is to vary the pages in some visual manner, such as changing color palettes, icons, layouts, fonts, graphics, and so forth. As another example, the pages may be distinguished by features that are unknown by the user, such as applying different computational algorithms for calculating costs of various items in a user's electronic shopping cart.

The trial manager 130 tracks statistical data in a statistical database 138 as users interface with web pages assigned to the control and test groups. For example, statistical data is captured and stored each time the client computer requests a web page. The collected statistical data may be correlated based on unique identifiers associated with the users. By correlating with identifiers, a series of transactions can be treated as a logical continual communication between the servers 110 and a particular client. Additionally, within the statistical data, individual user identities are kept anonymous, as they are identified by trial identifiers generated for purposes of the trial. One approach is to generate a unique trial identifier for each user based on a user or customer ID, a session ID, and a browser ID. This will be described below in more detail. Another approach for accumulating the interaction data is through the use of cookies. In general, a cookie stores user-specific information on a client computer. The cookie belonging to the particular client computer is passed to the servers 110 when a URL request is made. The servers 110 uses the cookie to identify the user in the statistical database 138, thereby allowing the trial manager 130 to track and store how the user interfaces with a web page associated with the URL request. Cookies are also discussed in greater detail later in this document.

The trial manager 130 then analyzes the interaction statistics to discern differences in user behavior resulting from users' experiencing different web pages. The trial manager 130 may further be configured to produce a report exhibiting these behavior differences for further analysis by the trial operators, and for additional experimentation. Since the continuous trial is performed for an indefinite period of time, the web pages in the test group may continue to be modified over time. That is, the web pages in the test group may be modified on multiple discrete times during the trial. This allows the trial operators to watch how evolving changes in the web pages may affect user behavior when interacting with the website. The frequency and extent of the modifications during the continuous trial are selectable parameters controlled by the trial operators. This concept is explained in the next section.

Example Web page Modifications During Trial

Figure 2:
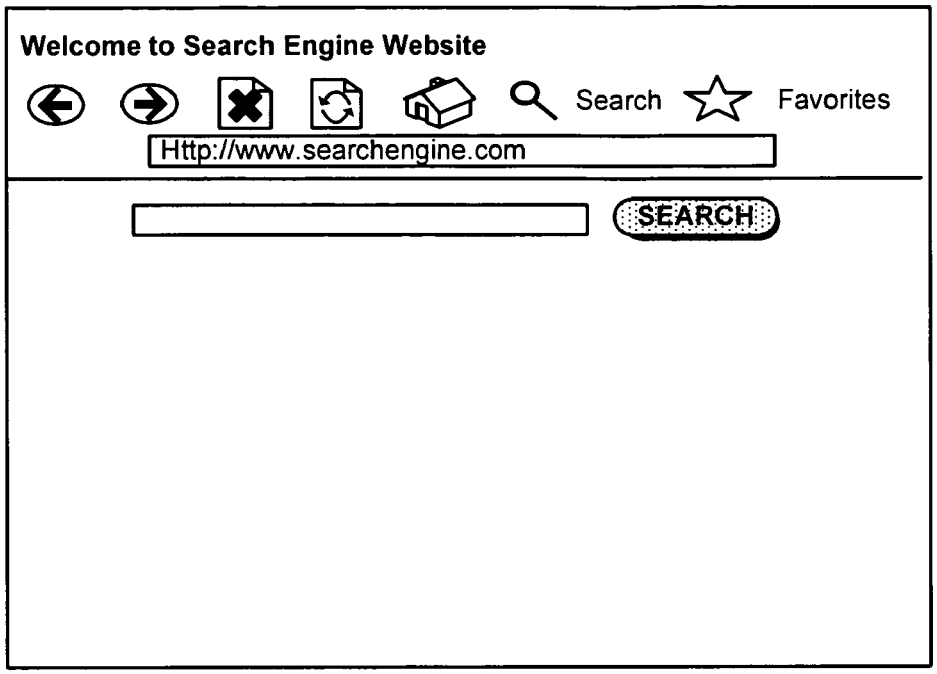
FIG. 2 illustrates one example of a control group web page that may be rendered by a web browser on a display of a computing device.

FIG. 2 illustrates the control group web page 140 that may be rendered on a display of a computing device 102 in the control group 118 (FIG. 1). The web page 140 omits any banner ads. The control group web page 140 is viewed by a user population in the control group when they access the website 106.

Figure 3:
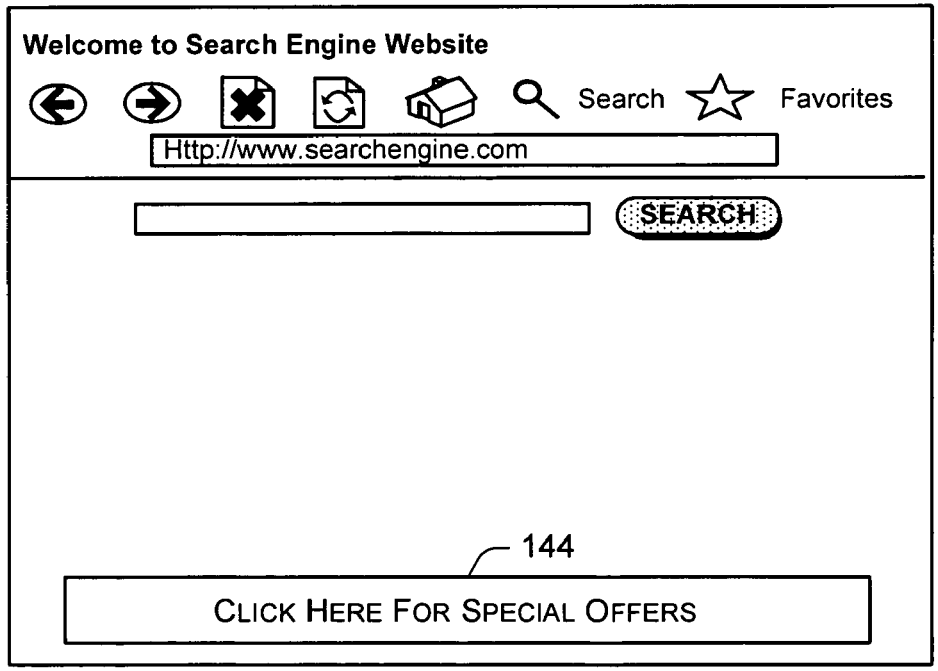
FIGS. 3-5 illustrate examples of test group web pages that differ in some manner from the control group web page of FIG. 2 and that are modified over time as part of the continuous usability trial.
Figure 4:
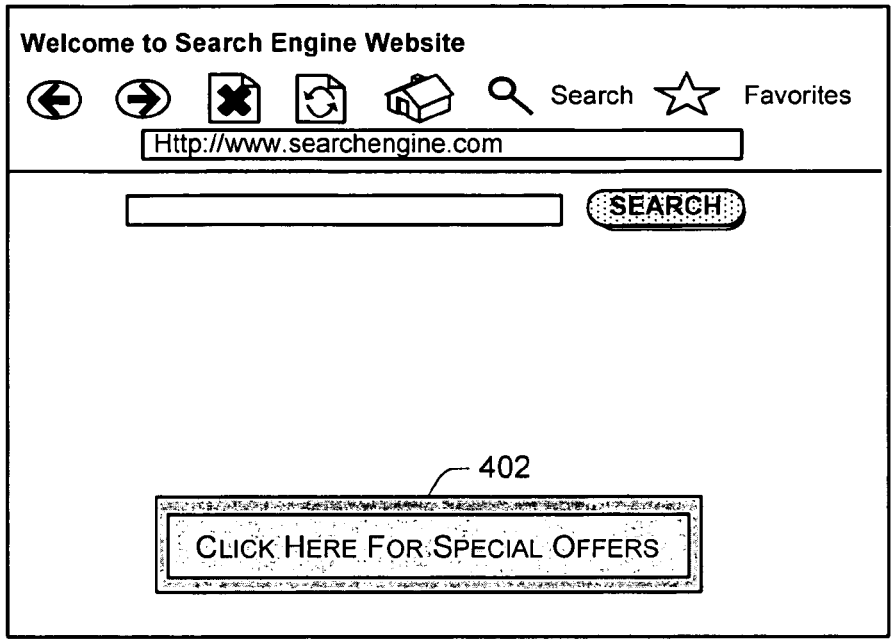
Figure 5:
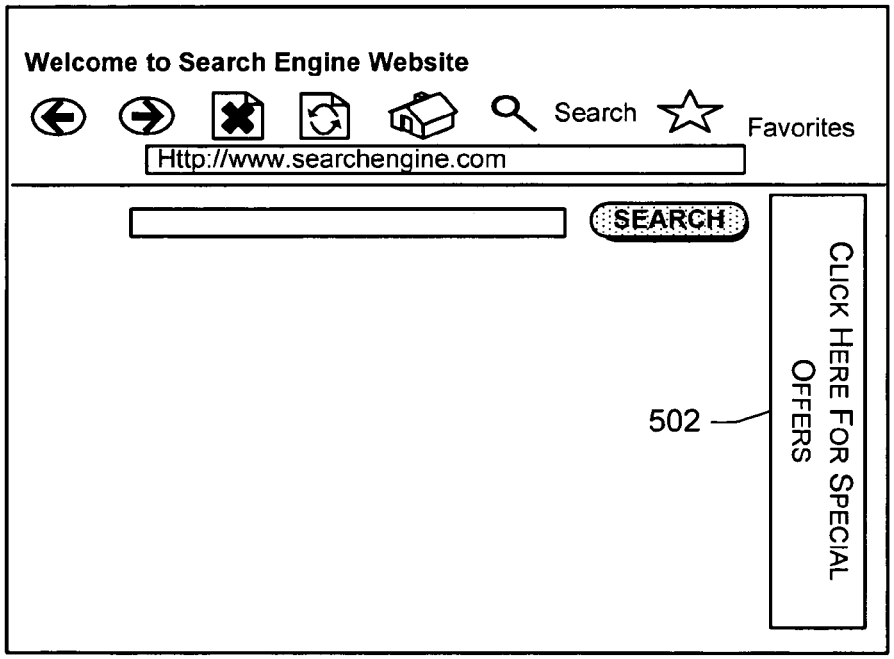

FIGS. 3-5 illustrate examples of test group web pages that differ in some manner from the control group web page of FIG. 2 and that evolve over time as part of the continuous usability trial. More particularly, FIG. 3 shows a first version (i.e., version I) of the test group web page 142, as illustrated in FIG. 1. It differs from the control group web page 140 of FIGS. 1 and 2 in that a selection button 144 (i.e., the "Click Here for Special Offers" button) is added to the web page. In this example, the button 144 is arranged horizontally along the bottom of the page. The web page 142 is sent to users that are randomly assigned to the test group 120.

Notice that users access the same website (e.g., www-dot-searchengine-dot-com) to retrieve both the control group web page 140 and test group web page 142. The web page distributor 136 of the trial manager 130 controls which of the web pages is sent to respective client computers of requesting users, depending on which group the requesting user belongs to in the user group repository 134. The trial manager 130 logs statistical data in the statistics database 138 based on the requesting user's interaction with the web pages 140 and 142. For example, the trial manager 130 may track how often requesting users select the "Click Here" button 144 of the web page 142. The information is stored in the statistics database 138 and used to determine if users are interested in "Special Offers" accessed via the button 144.

FIG. 4 illustrates a second version (i.e., version II) of the test group web page 400 which is slightly modified from the first version 142 of FIG. 3. In this example, the modification involves reducing the size and adding or changing color of the selection button, as represented by button 402. The second version 400 may be introduced at some point in the continuous trial after sufficient data has been taken regarding user interaction with the first version of the test web page 142. The modification is performed, as part of the ongoing trial and substituted for version I of the test group web page. After the change is made, users in the test group 120 are served version II of the test group web page 400 when they access the website 106, instead of the first version of the web page 142. The web page distributor 136 of the trial manager 130 controls the substitution of web pages and distribution of the new version.

The trial manager 130 continues to log statistical data in the statistics database 138 based on the user interaction with the web pages 140 and 400. For example, the trial manager 130 continues to track how often users select the "Click Here" button 402 of the web page 400. The information is stored in the statistics database 138 and used to determine if users prefer interaction with a smaller and/or colorized version of the selection button 402 on version II of the test web page over the button 144 in the version I of the test web page 142.

FIG. 5 illustrates a third version (i.e., version III) of the test group web page 500 which is again modified from the first version 142 of FIG. 3 and the second version 400 in FIG. 4. In this example, the modification involves orienting the selection button vertically along the right side of the web page 500, as represented by button 502. The modification is once again performed as part of the ongoing trial and substituted for version II of the test group web page after some period of time has elapsed. After the change is made, users in the test group 120 are served version III of the test group web page 500 when they access the website 106, instead of the previous web page version 400. The web page distributor 136 of the trial manager 130 controls the substitution of web pages and distribution of the newest version.

As the changes are made, the trial manager 130 continues to log statistical data in the statistics database 138 based on the user interaction with the new web page 500. The trial manager 130 continues to track how often users select the "Click Here" button 502 of the web page 500 and stores this information in the statistics database 138. The information is then used to compare user preferences of a vertically oriented button 502 on version III of the test web page 500 with respect to the smaller and/or colorized version of the selection button 402 on version II of the test web page 400 and the button 144 in the version I of the test web page 142. Further, the information may be used to ascertain how user behavior of the test group changes as the various test web pages are introduced in comparison to the control group of users who receive the same web page.

The trial operators can continue to modify the web pages served to the test group as many times as they wish. In addition to adding attributes or changing appearance, the trial operators may also modify content or change features not readily noticeable to the user group.

FIGS. 3-5 show just one example of how web pages for the test group undergo multiple modifications at separate occasions over time. For ease of discussion, the modifications described above were single changes affecting the visual appearance of the web page (i.e., separately changing color, size, and location of the "click here" button). In other implementations, the modifications may involve other types of alterations, such as changes in content or underlying functionality that may not be visible to the user. Moreover, in some implementations, multiple modifications may be made simultaneously for a new version of the test group web page. For instance, the next iteration of the test group web page may involve concurrently changing the location of the "click here" button, using a different color scheme for the web page, changing the underlying functionality that supports user interaction with the web page, and altering the content of the button to say something different (e.g., "Looking for Specials?").

Additionally, the modifications may be imposed at certain locations on the website, but not others. For example, with respect to an online merchant website, the modifications may be made to features on test group web pages pertaining to a first item category (e.g., books), and not to the same or similar features on test group web pages pertaining to another item category (e.g., DVDs).

Trial Manager Implementation

Figure 6:
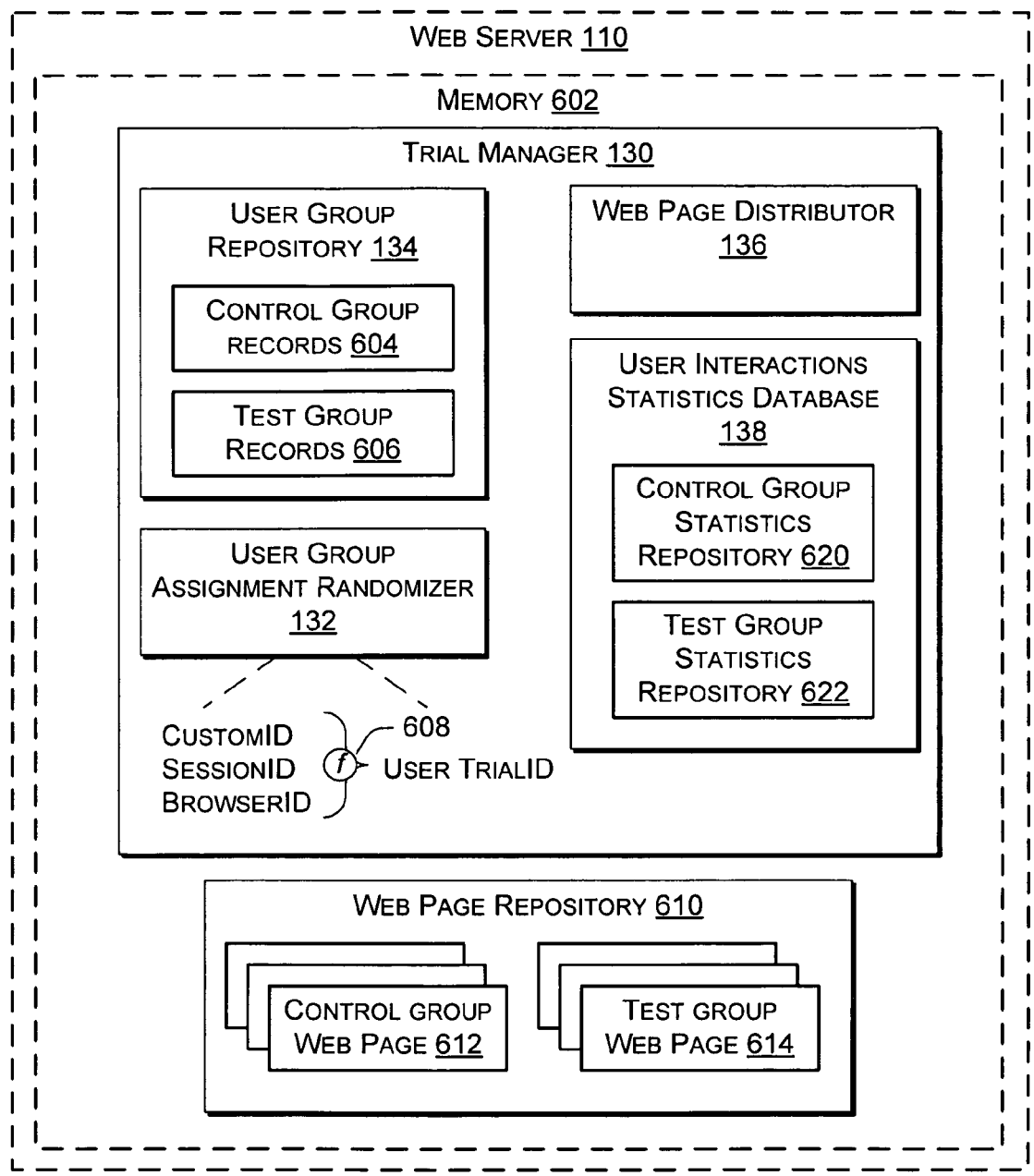
FIG. 6 is a block diagram illustrating modules in a trial manager for managing the continuous usability trials.

FIG. 6 illustrates an example implementation of the trial manager 130 that is implemented on one or more of the web servers 110(1)-110(M). The web servers have processing capabilities and memory suitable to store and execute computer-executable instructions. In this example, the trial manager 130 is implemented as software or computer-executable instructions stored in a memory 602 of the web server(s) 110 and executed by one or more processors of the web server(s) 110. The memory may be implemented as non-removable persistent storage of the servers, although other suitable computer storage media may also be used to store the trial manager 130. An example of a computer system is provided below with reference to FIG. 7.

The trial manager 130 includes the user group repository 134, which maintains a listing of all users in the control group 118 and the test group 120. The user group repository 134 stores control group records 604 for users in the control group 118 and test group records 606 for users assigned to the test group 120. In one implementation, the records are indexed by a suitable identifier, such as a customer identifier. By using suitable identifiers, the data may be organized without having to store personal information about the users. In this manner, the continuous trial may be performed to observe general behavior patterns of large groups of users, without intruding on individual users' privacy. The repository 134 may also include information pertaining to users that are waiting to be placed in one of the groups 118 or 120.

The trial manager 130 manages the various user groups defined in the group repository 134. This management function includes assigning users who access the website 106 to the various groups in the user group repository 134. In one exemplary implementation, the trial manager 130 employs the user group assignment randomizer 132 to assign users to the control and test groups. For instance, the randomizer 132 may randomly assign a predetermined number of users to the test group 120, while leaving unassigned users or the general population of users in the control group 118. Generally, the trial manager 130 attempts to form groups that are statistically meaningful and relevant for the purposes of the trial. The number of users in each group is a selectable parameter controlled by those operating the trial.

Various example procedures that the trial manager 130 may employ to assign users to the various groups will now be discussed. When a user computer 102 or 104 accesses the web server 110, a session ID and/or browser ID may be included as part of the URL request. The session ID and/or browser ID may be any type of identifier that serves to uniquely identify a particular client computer to the server. Generally, the session ID and/or browser ID is part of the HTTP request syntax that is sent by the client computer as part the URL request. The user may also be assigned a unique customer ID during a logon procedure with the website 106, which may also be used by the trial manager 130 during the group assignment process. The trial manager 130 facilitates assignment of the unique identifiers.

Once the identifier is obtained, the trial manager 130 uses the randomizer 132 to associate the user with one of the groups in the user group repository 134. The randomizer 132 randomly creates a control group record 604 or a test group record 606 in the repository 134. Each record includes a unique identifier. Cookies may also be used by the trial manager 130 during the user assignment process. A cookie is an information/tracking element that a web server can store on a client computer. Cookies allow a web server to store information on a user's client computer and user that information when the user returns to the website. The pieces of information are stored as "name-value pairs" comprised of, for instance, a variable name (e.g., user ID) and a value (e.g., A9A3BECE0563982D) associated with that variable name. In the same manner discussed in relation to session IDs, browser IDs and user IDs, the user group assignment randomizer 132 may use all or part of cookie name-value pairs to assign users to the groups of the group repository 134. Cookies are typically stored in a directory of the user's computer. The directory may list a vast number of name-value pairs, each associated with a particular domain from which they originated, representing all of the web servers that have placed a cookie on that particular computer. Each time a client computer accesses a web server, the web server contacts the client computer to determine if a cookie resides on the client computer that is associated with the web server. If an associated cookie exists, the client computer will send the related name-value pair to the server.

In one particular approach, the user group assignment randomizer 132 employs a combination of the customer ID, session ID, and browser ID to ensure that each user is consistently placed in the same group regardless of whether they log onto the website 106 from different computers or browsers. In this implementation, the randomizer 132 implements a random number generator that is seeded with a randomization key based on a combination of the customer ID, session ID, and browser ID. The unique output of the generator forms a unique user trial ID, which is employed to assign users to groups with arbitrary precision. This unique user trial ID may also be used as an identifier in the user records 604 and 606 maintained in the user group repository 132. This implementation is illustrated conceptually in FIG. 6 as the user trial ID being produced as a function 608 of the customer ID, session ID, and browser ID. With this approach, the randomizer 132 attempts to form two different groups of customers that are statistically unbiased so that the segregation of customers does not affect or otherwise bias the trial. It should be noted, however, that in certain implementations, there may be a reason to separate customers into groups according to some predefined non-arbitrary process that is part of the overall trial. Accordingly, non-arbitrary group assignment techniques may also be employed during a continuous trial.

During the user assignment process, the trial manager 130 may be configured to notify the randomizer 132 if the test group 120 reaches a predefined maximum user capacity. If the test group is full, users default to the control group 118. Also, the control group may have an established capacity, and if it is reached, user assignment may be bypassed. In this situation, unassigned users will have access to the website 106 and receive the web pages of the control group or other pages that are not involved in the trial.

The records stored in the repository 134 associate the identifier (e.g., user ID, browser ID, user trial ID, etc.) with a link or pointer to web pages stored in a web page repository 610 maintained by the website 106. The web page repository 610 stores the different versions of the web pages that will be served to the various groups. In this example, a first set of web pages 612 (i.e., control web pages) are served to the control group 118 and a second set of web pages 614 (i.e., test web pages) are served to the test group 120. The sets of web pages may be stored in a static state, or may be generated dynamically when requested.

The trial manager 130 employs a web page distributor 136 to handle URL requests from the users. When a user computer 102 or 104 makes a URL request to the website 106, the web page distributor 136 extracts the client identifier received in URL request or cookie (or generates the user trial ID from such identifiers) to determine which group in the user group repository 134 the user belongs. If the identifier is not found in the test or control groups, the trial manager 130 performs the group assignment process discussed above or passes the user onto normal website operations outside the scope of the trial.

On the other hand, if the identifier is located in the repository 134, the web page distributor 136 chooses the appropriate pages to serve the requesting client using the link or pointer from the records of the repository 134. For example, suppose that a user from the test group 120 accesses the website 106. The web server 110 uses an identifier extracted from the URL or cookie, or derived by the generator, to locate a control group record 604 in the repository 134. From that record, the web page distributor 136 identifies the test web pages 614 in the web page repository 610 to serve to the requesting client. Examples of different versions of a test group web page are illustrated in FIGS. 3-5. The trial manager 130 handles subsequent URL requests in the same manner.

During the continuous trial, operators continue to modify the test group web pages 614 over time. With each modification, the updated web pages 614 replace previous versions in the repository 610 so that the modified versions are served to the users in the test group. Alternatively, the newer versions of the test group web pages 614 are also stored in the web page repository 610 and the records in the user group repositories are updated to point or link to the newest version.

The trial manager 130 further includes the user interactions statistics database 138 to track statistical data related to the manner in which users interact with the control and test web pages associated with the control and test groups. The statistical data is collected during the continuous trial and stored in the corresponding repositories 620 and 622. More specifically, as users interact with web pages associated with the control group 118, statistical data is captured and stored in the control group statistics repository 620. As users interact with web pages associated with the test group 120, statistical data is captured and stored in the test group statistics repository 622.

Collected statistical data may include, but is not limited to: page access; an amount of time a user remains on a given web page—both inactive and active time may be accounted for; errors, or lack thereof, that may occur as certain web content is accessed; how often a certain icon or selection button is chosen on a given web page; and frequency of purchases, or lack thereof, from a given web page. Essentially any type and/or quantity of statistical data can be defined by the trial operator.

The trial manager 130 may present the statistical data to the trial operator in a form that lends understanding to user patterns when interacting with the website. In particular, statistics may be provided to help website operators learn how different versions of the web page affect user behavior. Further, once a particular behavior is identified, the operator may elect to further modify the test web pages to better understand the behavior or evaluate if the behavior changes as a result of the modification. Since the trial is continuous, the operators can continue to try different approaches and conduct diverse studies.

Exemplary Computing Device

Figure 7:
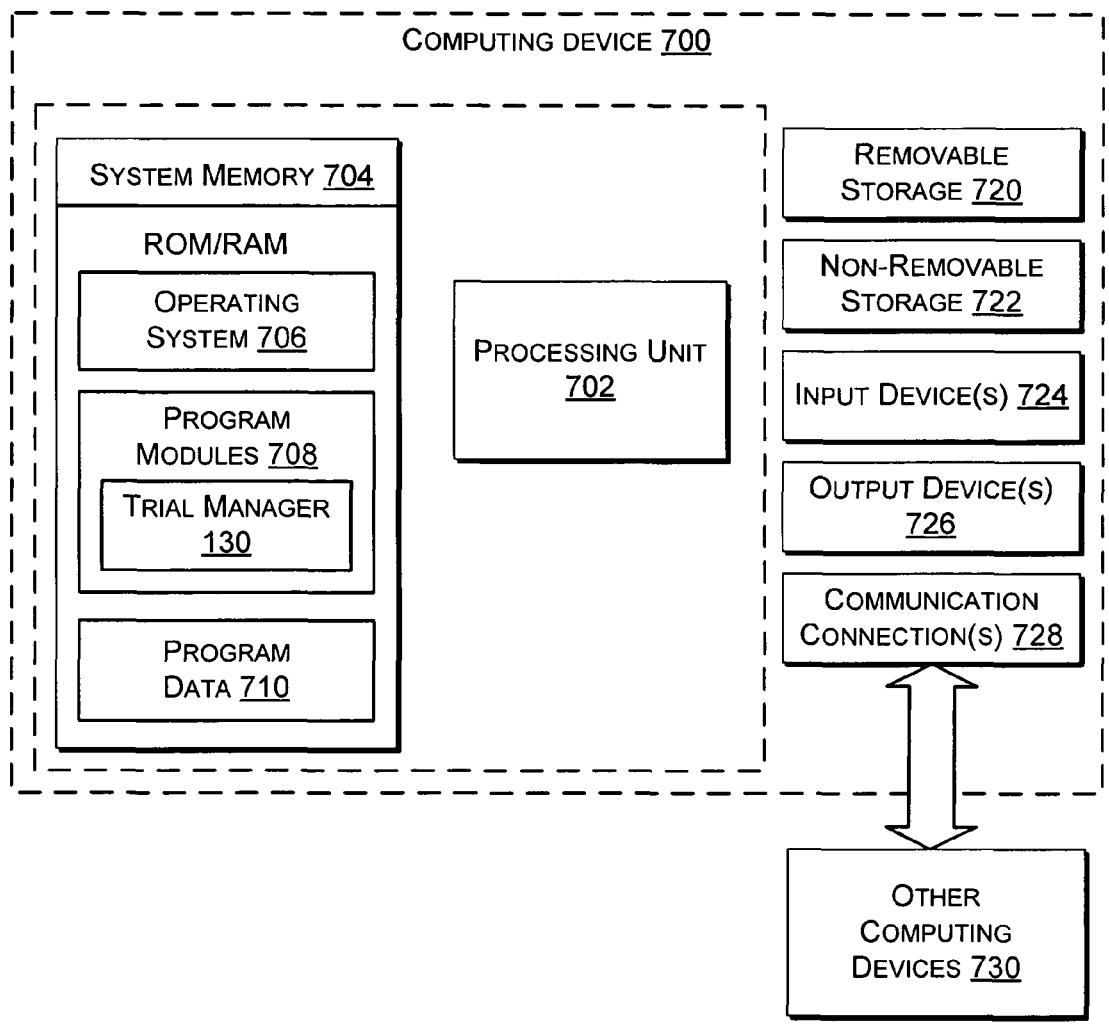
FIG. 7 is a block diagram illustrating functional components in a computing device that might be used to implement the clients or servers in FIG. 1.

FIG. 7 is an illustrative computing device that may be used to implement the web servers 110(1)-110(M), client computers 102(1)-102(J) and 104(1)-104(K). In a very basic configuration, the computing device 700 includes at least one processing unit 702 and system memory 704. Depending on the exact configuration and type of computing device 700, the system memory 704 may be volatile (such as RAM), non-volatile (such as ROM, flash memory, etc.) or some combination of the two. The system memory 704 typically includes an operating system 706, one or more program modules 708, and may include program data 710. For the present continuous usability trial implementation, the program modules 708 may include the trial manager 130. As an alternative, the trial manager 130 may be implemented as part of the operating system 706, or it may be installed on the computing device and stored in other memory (e.g., non-removable storage 722) separate from the system memory 706.

The computing device 700 may have additional features or functionality. For example, the computing device 700 may also include additional data storage devices (removable and/or non-removable) such as, for example, magnetic disks, optical disks, or tape. Such additional storage is illustrated in FIG. 7 by removable storage 720 and non-removable storage 722. Computer storage media may include volatile and non-volatile, removable and non-removable media implemented in any method or technology for storage of information, such as computer readable instructions, data structures, program modules, or other data. The system memory 706, removable storage 720 and non-removable storage 722 are all examples of computer storage media. Thus, computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 700. Any such computer storage media may be part of the device 700. Computing device 700 may also have input device(s) 724 such as keyboard, mouse, pen, voice input device, touch input device, etc. Output device(s) 726 such as a display, speakers, printer, etc. may also be included. These devices are well know in the art and need not be discussed at length.

The computing device 700 may also contain a communication connection 728 that allow the device to communicate with other computing devices 730, such as over a network like network 108 of FIG. 1. Communication connection(s) 728 is one example of communication media. Communication media may typically be embodied by computer readable instructions, data structures, program modules, or other data in a modulated data signal, such as a carrier wave or other transport mechanism, and includes any information delivery media.

Various modules and techniques may be described herein in the general context of computer-executable instructions, such as program modules, executed by one or more computers or other devices. Generally, program modules include routines, programs, objects, components, data structures, etc. for performing particular tasks or implement particular abstract data types. These program modules and the like may be executed as native code or may be downloaded and executed, such as in a virtual machine or other just-in-time compilation execution environment. Typically, the functionality of the program modules may be combined or distributed as desired in various embodiments. An implementation of these modules and techniques may be stored on or transmitted across some form of computer readable media.

Operation

Figure 8:
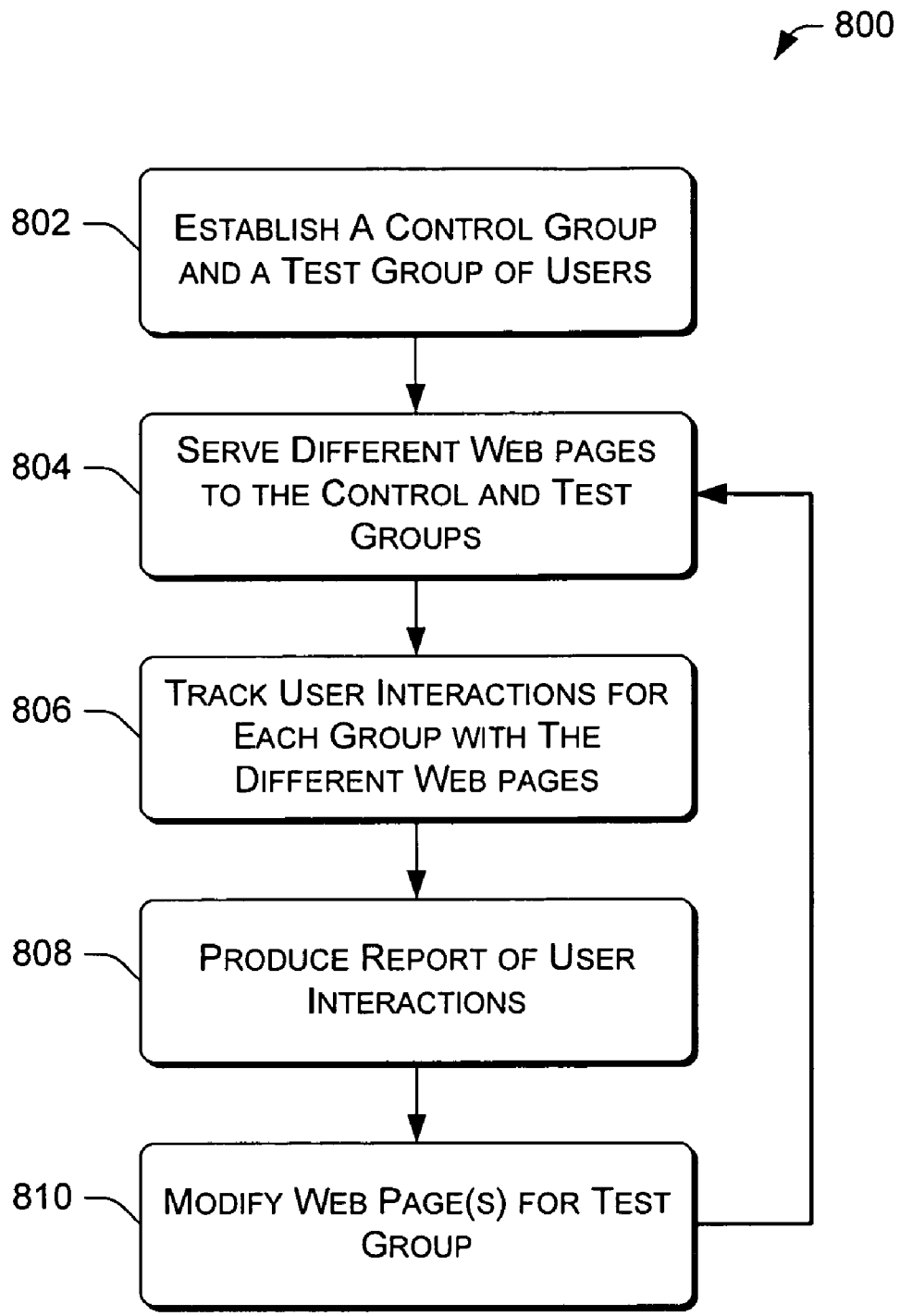
FIG. 8 is a flow diagram of a process for performing a continuous usability trial.
Figure 9:
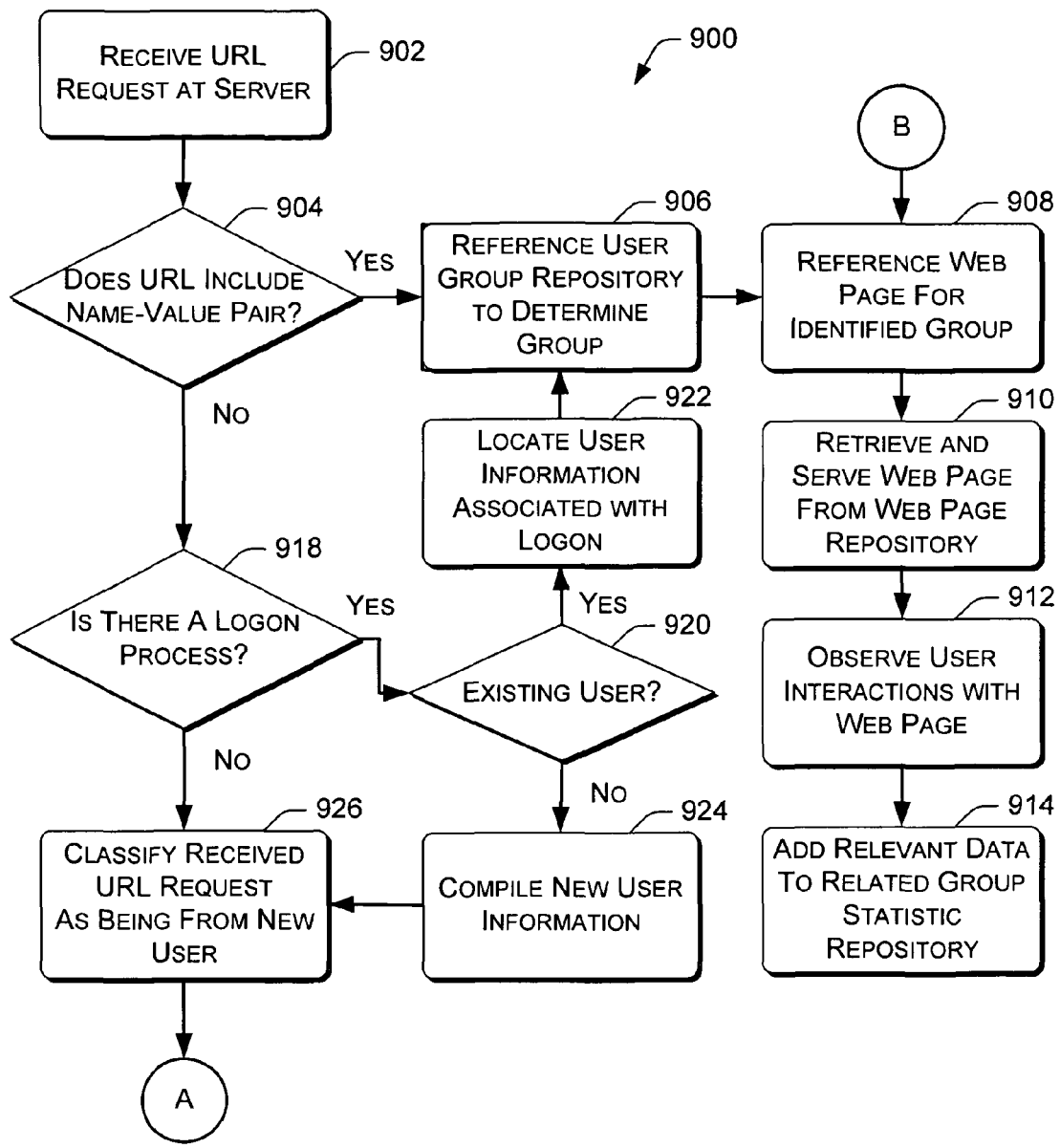
FIG. 9 is a flow diagram of a process for statistically tracking user interactions with web pages during the continuous trial.
Figure 10:
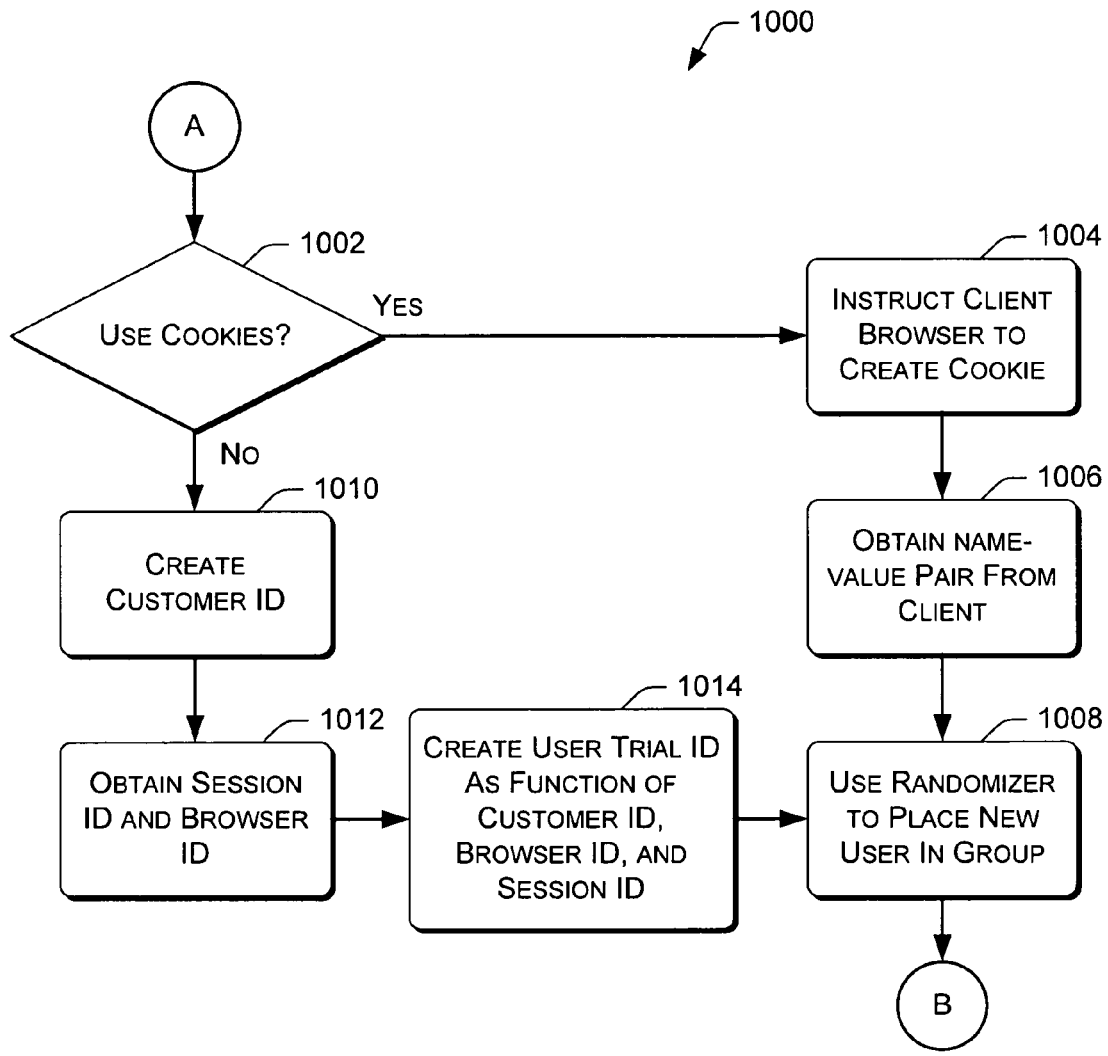
FIG. 10 is a flow diagram of a process for assigning users to various groups in the continuous usability trial.

FIGS. 8-10 illustrate example processes for conducting a continuous usability trial for a website. Each process is illustrated as a collection of blocks in a logical flow graph, which represent a sequence of operations that can be implemented in hardware, software, or a combination thereof. In the context of software, the blocks represent computer-executable instructions that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the process.

For discussion purposes, the processes are described with reference to system 100 of FIG. 1, and the trial manager 130 described with reference to FIGS. 1 and 6. In particular, many acts described below may be implemented and performed by the trial manager 130 illustrated in FIGS. 1 and 6. Users referred to in the following, as well as the foregoing, are generally interfacing with a client computer, or similar computing device, of the type described herein with reference/to FIGS. 1 and 7.

FIG. 8 shows a general process 800 for conducting a continuous usability trial for a website. The trial is executed at or on behalf of a website with many users. At block 802, a control group of users and a test group of users who visit the website are established. It is noted that multiple control groups and multiple test groups may be established concurrently, and multiple trials may be conducted simultaneously. In one implementation, users from the website's current roster or repository of users are randomly allocated to the control and test groups. Alternatively, or additionally, new users to the website may be randomly assigned to the control and test groups when they first access the website. As noted above, one particular implementation uses a function of the customer ID, a session ID, and a browser ID to seed a random number generator, which then produces a unique trial identifier to track each user during the continuous trial. This combination of identifiers ensures that each user is consistently placed in the same group regardless of whether they log onto the website from different computers or browsers.

At block 804, different web pages are served to users depending upon their group affiliation. For instance, a first set of control web pages are sent to users assigned to the control group and a second set of test web pages are served to users assigned to the test group. However, this process is transparent to the users, as the users simply access the same website (e.g., both sets of users enter the same web address, such as, www-dot-searchengine-dot-com). In one implementation, the web page distributor 136 of trial manager 130 indexes into a user record 604 and 606 using the unique identifier (e.g., user ID, browser ID, trial identifier, etc.) and is directed to the appropriate set of web pages in the web page repository 610. The pages are served to the user and rendered by the user's browser on the computing device.

At block 806, user interactions with the different web pages are tracked. In one implementation, various statistics defined by the operator are compiled and stored in the statistics database 138. Statistics pertaining to user interactions with web pages in the control group are stored in the control group statistics repository 620 and statistics pertaining to user interactions with web pages in the test group are stored in the test group statistics repository 622. The statistics may be essentially any type, form, or metric of data that can be defined by the trial operator. Examples of statistical data include page access, duration of stay on a web page, errors, selection of specific options, frequency of purchase, conversion rates, click through rates, and so on.

At block 808, a report can optionally be generated for presentation to the trial operators. The report provides the statistical results pertaining to the control and test groups, as compiled over time during continuous trial. The report may be presented as part of a graphical user interface, or formatted and printed in hardcopy. The trial manager may also perform some analysis on the statistical data to provide more useful information to the trial operator. For instance, the trial manager may perform statistical analysis on the data, providing such information as averages, means, standard deviations, and so forth. The report may further compare user interactions of the control user group with their web pages with respect to the user interactions of the test user group with their web pages.

At block 810, one or more of the web pages in the test group are modified as part of the continuous trial. The modifications may be part of an overall trial strategy, or in response to observations made from the statistical results of user interactions with the current version of the web page. Once modified, the new version of web pages is served to the test group, as represented by the return loop to block 804. New statistics are compiled for user interactions with the new web pages (block 806) and reports generated (block 808). Since the trial is indefinite in duration, the loop defined by the service of web pages (block 804); tracking of user interactions (block 806), report generation (block 808), and page modification (block 810) may be performed unlimited times during the course of the continuous trial.

A more specific implementation of certain aspects of the general process 800 will now be described with reference to FIGS. 9 and 10. This implementation merely provides one example embodiment, and is not intended to be limiting. Other implementations may be used.

FIG. 9 shows one example process 900 for identifying which of the groups (control or test) the user belongs to, and tracking statistical data pertaining to the user's experience when served different web pages as part of the continuous usability trial. In this implementation, it is assumed that a user, using a client computer, communicates over a network with a web server to request delivery of at least one web page associated with a website.

At block 902, a URL request for a web page of a website is received at the server. At block 904, the server determines if the URL request includes a name-value pair, such as that found in a cookie. The inclusion of the name-value pair indicates that the user's client computer has had prior contact with the server. If the name-value pair is included with the URL request (i.e., the "Yes" branch from block 904), the server references a user group repository to determine if the name-value pair is contained in one of a plurality of user groups, including the control group and the test group (block 906). In one implementation, this might involve searching the control and test group records maintained in the user group repository for a reference to the name-value pair received in the URL.

In another implementation, the URL may simply contain a user ID and/or a browser ID. The server may use these two identifiers, along with another identifier such as a session ID, to derive a unique user trial identifier. As noted above, the derivation may involve using random number generation to produce the unique user trial ID. This unique user trial ID can then be used to index through the control and test group records.

At block 908, once a user is identified to belonging to a particular group (e.g., control or test group), a web page associated with the identified group is referenced (e.g., link or pointer in the record, or some other mechanism). At block 910, the referenced web page is retrieved from the website repository (e.g., repository 610) and served to the user's client computer. If the user was found to be part of the control group, the server retrieves and serves one of the control web pages 612. On the other hand, if the user was part of the test group, the server retrieves and serves on of the test web ages 614. It is noted that if the identifier is not found in any of the groups, a web page intended for general web population is returned to the user's client computer.

At block 912, the user's interaction with the web page is observed. Observation may be achieved using conventional user tracking methods intrinsic to cookies. However, other web observation techniques may be used as well. Based on the observations and the goals of the trial, any desired statistical data may be collected and added to the appropriate group or test repository of the statistics database 138 (block 914).

Returning now to block 904, if the URL request does not include a name-value pair or some other identifier (i.e., the "No" branch from block 904), the process attempts to use the logon process to discover whether the user is in a group. If a logon process exists (i.e., the "Yes" branch from block 918), the process checks whether the user making the URL request is an existing user (block 920). The user group repository may contain references to existing users. If the user is an existing user (i.e., the "Yes" branch from block 920), user information related to the existing user is obtained (block 922). The user information may be in the form of a user ID, email address, or some other unique user identifier that was used by the server to randomly place users in the groups of the user group repository. Once the user information is obtained, the instructions of blocks 906-914 are performed. If the user is not an existing user (i.e., the "No" branch from block 920), new user information is obtained from the user making the URL request (block 924). This may involve asking the user to provide an address, phone number, email address, password, etc. Using this new information, the website servers can generate a unique identifier that will allow random placement of the new user into one of the groups in the user group repository.

Once the new user information is obtained, or if there is no logon process (i.e., the "No" branch from block 918), the URL request is classified as being sent by a new user or at least sent from a client computer associated with a user who has not previously obtained web content from the website (block 926). Once classified as a new user, the user can be assigned to one of the user groups (e.g., control or test group), in which one example is illustrated in more detail with reference to FIG. 10.

FIG. 10 shows one example process 1000 for assigning users to one of the groups monitored as part of the continuous usability trial. In this example implementation, it is assumed that the user is not associated with any of the groups contained in a user group repository stored on the server. To illustrate how this process may be integrated with the process 900 of FIG. 9, notice that connect labels "A" and "B" are used to demonstrate how flow between the processes may be achieved. It is noted, however, that each of the processes may stand on its own independent of the other.

At block 1002, the process determines whether cookies' should or can be used for uniquely identifying the users in the various groups. As part of this operation, the server determines if the user's client computer accepts cookies. A browser security scheme of the client computer generally determines if cookies are accepted from web servers. If the user's client computer accepts cookies (i.e., the "yes" branch from block 1002), the server instructs the user's client computer to create a cookie that includes an associated name-value pair (block 1004). At block 1006, the server obtains the name-value pair from the user's client computer. This may happen by default when the user's client computer sends the cookie back the server. At block 1008, the server uses the name-value pair to randomly place the new user in one of the groups in the user group repository. Once the user is in a group, the appropriate web pages may be served to that user, as described above with reference to FIG. 9.

If it is desirable to use a method other than cookies to create a unique trial ID for the user (i.e. the "No" branch from block 1002), a customer ID is created if one doesn't already exist (block 1010). The trial manager 130 or other component (e.g., logon module) at the website can perform this function. At block 1012, the session ID and browser ID are obtained. At block 1014, a unique user trial ID is created as a function of the customer ID, browser ID, and session ID. More particularly, the customer ID, session ID, and browser ID are input as part of a seed to a random number generator which creates a unique user trial ID. The randomizer then randomly assigns users to particular groups based on this unique user trial ID (block 1008).

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. A method, comprising:
   establishing a control group of users and a test group of users who access an online merchant website hosting a collection of items for acquisition via user computing devices, each user having a unique identifier and each user computing device having a respective unique identifier that is different from the respective unique identifier of the user, wherein each item in the collection of items is associated with at least one category of multiple categories represented in the collection of items;
   randomly assigning, at a server, each of the users who access the online merchant website to one of the control group of users or the test group of users upon each of the users first accessing the online merchant website during a continuous trial, the randomly assigning being based at least in part on the unique identifier of the respective user by employing the unique identifier of the respective user to determine a unique trial identifier for the respective user, the unique trial identifier operating to recognize the respective user as assigned to the control group of users or the test group of users regardless of a computing device from which the respective user accesses the online merchant website;
   serving, during subsequent access of the online merchant website, a first set of one or more web pages of the online merchant website to the control group of users and a second set of one or more web pages of the online merchant website to the test group of users based at least in part on the unique trial identifier for each respective user;
   tracking user interactions of the control group of users with the first set of one or more web pages and of the test group of users with the second set of one or more web pages; and
   modifying, on multiple occasions over time and concurrently with tracking the user interactions of the control group of users and the test group of users, at least one web page of the second set of one or more web pages of the online merchant website to evaluate whether the user interactions change in response thereto.

2. A method as recited in claim 1, wherein the first set of one or more web pages and the second set of one or more web pages web pages contain similar content, but have different functionality.

3. A method as recited in claim 2, wherein the functionality comprises underlying functionality not visible to the user that supports interaction of the user with the at least one web page.

4. A method as recited in claim 1, wherein the first set of one or more web pages and the second set of one or more web pages contain similar content, but have different appearances.

5. A method as recited in claim 1, wherein:
   the establishing comprises obtaining the unique identifier of each respective user.

6. A method as recited in claim 1, wherein:
   the establishing comprises deriving the unique trial identifier for each respective user as a function of the unique identifier of each respective user, a session ID, and a browser ID; and
   the randomly assigning is based at least in part on the unique trial identifier.

7. A method as recited in claim 1, further comprising:
receiving requests at the online merchant website, where the requests were made by accessing a common website;
determining whether the users belong to one of the control group of users or the test group of users; and
retrieving pages of the first set of one or more web pages for users determined to be in the control group of users and pages of the second set of one or more web pages for users determined to be in the test group of users.

8. A method as recited in claim 1, wherein the serving of the first set of one or more web pages and the second set of one or more web pages comprises serving first and second versions of a single common set of web pages.

9. A method as recited in claim 1, wherein the tracking user interactions comprises collecting statistical data pertaining to the users' activities at the first set of one or more web pages and the second set of one or more web pages.

10. A method as recited in claim 1, wherein the tracking user interactions comprises tracking user clickstream data.

11. A method as recited in claim 10, wherein the tracking user clickstream data comprises tracking user click-through data.

12. A method as recited in claim 1, wherein:
the online merchant website provides an interactive presentation of the collection of items for acquisition;
the serving of the first set of one or more web pages comprises serving a first set of pages in which one or more individual pages have content representing an item of the collection of items for acquisition, the first set of one or more web pages taken together thus having content representing at least a first portion of the collection of items for acquisition; and
the serving of the second set of one or more web pages comprises serving a second set of pages in which another one or more individual pages have content representing another item of the collection of items for acquisition, the second set of one or more web pages taken together thus having content representing at least a second portion of the collection of items for acquisition.

13. A method as recited in claim 12, wherein the serving of the second set of one or more web pages comprises serving one or more pages in which the another one or more individual pages have content representing an item that is also represented by the content of at least one page in the first set of one or more web pages, the second set of one or more web pages taken together thus representing at least the second portion of the collection of items for acquisition that is at least partially co-extensive with the first portion.

14. A method as recited in claim 1, further comprising:
generating, based at least in part on an underlying data set, the first set of one or more web pages to be served, wherein the underlying data set comprises records stored in a repository; and
generating, based at least in part on said underlying data set, the second set of one or more web pages to be served.

15. A method as recited in claim 1, wherein the modifying comprises changing a visual attribute of at least one web page in the second set of one or more web pages.

16. A method as recited in claim 1, wherein the modifying comprises changing at least one web page in the second set of one or more web pages to one of add or omit an attribute that involves user interaction.

17. A method as recited in claim 1, wherein the modifying comprises changing an attribute not detectable from human observation of the second set of one or more web pages.

18. A method as recited in claim 17, wherein the attribute comprises a computational algorithm for calculating costs of various items in the user's electronic shopping cart.

19. A method as recited in claim 1, wherein the second set of one or more web pages are modified on a number of occasions that is unknown when the control group of users and the test group of users are established.

20. A method as recited in claim 1, further comprising comparing (1) the user interactions of the control group of users with the first set of one or more web pages with (2) the user interactions of the test group of users with the second set of one or more web pages.

21. A method as recited in claim 1, further comprising generating a report on the user interactions.

22. A method as recited in claim 1, wherein the modifying comprises changing a computational algorithm used with the second set of one or more web pages.

23. A method as recited in claim 1, wherein the modifying the second set of the one or more web pages includes modifying at least one web page in the second set of the one or more web pages, and wherein the modified at least one web page represents a particular item of the collection of items for acquisition that is associated with a particular category of the multiple categories and the modifying is based at least in part on the particular category associated with the particular item represented on the at least one web page.

24. A method as recited in claim 1, wherein the establishing comprises deriving the unique trial identifier for each respective user as a function of the unique identifier of each respective user and a session identifier.

25. A method, comprising:
under control of one or more computer systems configured with executable instructions,
randomly assigning users including a particular user to a control group of users or a test group of users until the test group of users reaches a maximum capacity;
receiving a request from the particular user to access data at a website, the particular user having been assigned either the control group of users or the test group of users;
determining whether the particular user is included in one of the control group of users or the test group of users based at least in part on a unique trial identifier for the particular user, the unique trial identifier identifying the particular user as assigned to the control group of users or the test group of users regardless of a computing device with which the particular user accesses the website;
allowing the particular user to access first data at the website if the particular user belongs to the control group of users and allowing the particular user to access second data at the website if the particular user belongs to the test group of users;
changing the second data at the website on multiple occasions over time;
observing, during a subsequent access of the website by users in the control group of users and users in the test group of users, behavior differences between the users in the control group of users when interacting with the first data and the users in the test group of users when interacting with the second data; and
monitoring changes in the behavior differences over time as a result of occasionally changing the second data.

26. A method as recited in claim 25, wherein the website is a merchant website and the first data and the second data pertain to items offered on the merchant website.

27. A method as recited in claim 26, wherein the changing the second data comprises changing a subset of the second data based at least in part on a category associated with a respective item while not changing another subset of the second data based at least in part on another category associated with another respective item.

28. A method as recited in claim 25, wherein the particular user has an associated unique identifier, and the unique trial identifier for the particular user is based, at least in part, on the associated unique identifier of the particular user.

29. A method as recited in claim 25, wherein the request contains a name-value pair and the determining comprises indexing records using the name-value pair to discover whether the particular user is included the control group of users or the test group of users.

30. A method as recited in claim 25, wherein the request contains a customer ID and a browser ID, and the determining comprises generating the unique trial identifier as a function of a session ID, the customer ID, and the browser ID.

31. A method as recited in claim 25, wherein the first data comprises a first set of one or more web pages and the second data comprises a second set of one or more web pages, and the allowing the access comprises serving the first set of one or more web pages to the control group of users in response to requests from the control group of users and serving the second set of one or more web pages to the test group of users in response to requests from the test group of users.

32. A method as recited in claim 25, wherein the second data is changed any number of occasions during a non-limited duration.

33. A method as recited in claim 25, further comprising maintaining statistical data related to behavior of the users when accessing the first data and the second data.

34. A method as recited in claim 25, wherein the randomly assigning further comprises assigning users to the control group of users until the control group of users reaches a maximum capacity.

35. A method as recited in claim 34, further comprising bypassing user assignment once the test group of users and the control group of users reach maximum capacity.

36. A method as recited in claim 25, wherein the changing the second data at the website comprises changing an attribute of the second data not detectable from human observation of the website.

37. One or more computing devices, comprising:
one or more processors;
memory to store computer-executable instructions that, when executed by the one or more processors, perform the method of claim 25.

38. A method for conducting a usability trial for a website hosting an electronic catalog that comprises a number of items, each item associated with at least one category of multiple categories of the electronic catalog, the method comprising:
under control of one or more computer systems configured with executable instructions,
randomly assigning users who access the website to one of a control group of users or a test group of users;
serving a first set of one or more web pages to the control group of users and a second set of one or more web pages to the test group of users during a first and subsequent access of the respective first set of one or more web pages and second set of one or more web pages;
tracking user interactions of the control group of users with the first set of one or more web pages during the first and the subsequent access of the first set of one or more web pages and tracking user interactions of the test group of users with the second set of one or more web pages during the first and the subsequent access of the second set of one or more web pages;
modifying at least one web page in the second set of one or more web pages, wherein the modified at least one web page represents a particular item of the electronic catalog that is associated with a particular category of the multiple categories and the modifying is based at least in part on the associated particular category of the respective item represented on the at least one web page;
refraining from modifying at least one other web page in the second set of one or more web pages, wherein the at least one other web page represents another particular item of the electronic catalog that is associated with another particular category of the multiple categories and the refraining is based at least in part on the associated particular category of the respective item represented on the at least one other web page; and
repeating the serving, the tracking, the modifying, and the refraining for a period of time that is not ascertainable at a beginning of the usability trial.

39. A method as recited in claim 38, wherein a user is randomly assigned to one of the control group of users or the test group of users based at least in part on a unique identifier associated with the user that is derived as a function of a customer identifier that is separate from a device identifier associated with a computing device by which the user accesses the website.

40. A method as recited in claim 39, wherein the unique identifier is generated as the function of the customer identifier, and wherein the customer identifier comprises a cookie when the computing device accepts cookies, and the customer identifier comprises a non-cookie based user identifier when the computing device does not accept cookies.

41. A method as recited in claim 39, wherein the unique identifier associated with the user is generated as the function of the customer identifier, and a combination of a session ID and a browser ID.

42. A method as recited in claim 38, wherein the modifying comprises changing one of a visual, interactive, and unobservable attribute of at least one web page in the second set of one or more web pages.

43. A server system comprising:
one or more processors;
a memory, accessible by the one or more processors;
a trial manager stored in the memory and executable on the one or more processors to manage a trial of user interactions with a website, the trial manager configured to randomly assign each user that accesses the website to one of a first group of users and a second group of users based at least in part on a session identifier, and to serve first web pages of the website to the first group of users during first and subsequent access of the website and second web pages of the website to the second group of users during first and subsequent access of the website, wherein the second web pages differ from the first web pages; and
the trial manager being configured to modify, on multiple separate occasions over time, the second web pages served to the second group of users and to observe changes in user interactions between the first group of users and the second group of users as a result of modifications to the second web pages.

44. A server system as recited in claim 43, wherein the first web pages and the second web pages comprises first and second versions of a single common set of web pages.

45. A server system as recited in claim 43, wherein the website is a merchant website and the first web pages and the second web pages contain content describing items offered by the merchant website.

46. A server system as recited in claim 43, wherein the trial manager comprises a user group repository to maintain records of users assigned to one of the first group of users and the second group of users.

47. A server system as recited in claim 43, wherein the trial manager collects statistics of user interactions with the website during the trial of user interactions with the website.

48. A computer storage media having computer-executable instructions encoded thereon, the computer-executable instructions to configure one or more processors to perform operations for conducting a trial on user interactions with a website hosting a collection of items, the trial being of indeterminable length when initiated, the operations comprising:

randomly assigning particular users to one of a first group of users and a second group of users for the trial of indeterminable length, each of the particular users being identified by a particular user trial identifier that is calculated as a function of a device identifier associated with a device by which an associated particular user accesses the website;

serving a first set of web pages having respective uniform resource locators (URLs) to the first group of users during first and subsequent access of the website, based at least in part on respective user trial identifiers of the users of the first group of users, and serving a second set of web pages having the same respective URLs as the first set of web pages to the second group of users during first and subsequent access of the website, based at least in part on respective user trial identifiers of the users of the second group of users;

modifying, on multiple separate occasions, the second set of web pages for serving to the second group of users on subsequent accesses of the website; and tracking, via the user trial identifiers, the user interactions of the first group of users and the second group of users as the second set of web pages are modified.

49. A computer storage media as recited in claim 48, the operations further comprising:

generating, from an underlying data set, the first set of web pages to be served, wherein the underlying data set comprises records stored in a web repository; and generating, from said underlying data set, the second set of web pages to be served.

* * * * *